United States Patent [19]

Yang et al.

[11] Patent Number: 5,121,382

[45] Date of Patent: Jun. 9, 1992

[54] STATION-TO-STATION FULL DUPLEX COMMUNICATION IN A COMMUNICATIONS NETWORK

[75] Inventors: Henry S. Yang, Andover, Mass.; Michael W. Carrafiello, Hudson, N.H.; William Hawe, Pepperell, Mass.; Richard W. Graham, Derry, N.H.

[73] Assignee: Digital Equipment Corporation, Maynard, Mass.

[21] Appl. No.: 420,792

[22] Filed: Oct. 11, 1989

[51] Int. Cl.⁵ .............................................. H04L 5/14
[52] U.S. Cl. ..................................................... 370/31
[58] Field of Search ................. 370/31, 94.1, 24, 85.6

[56] References Cited

U.S. PATENT DOCUMENTS

| | | | |
|---|---|---|---|
| 4,288,868 | 9/1981 | Grotjohann et al. | 370/31 |
| 4,451,827 | 5/1989 | Kahn et al. | 340/825.52 |
| 4,649,384 | 3/1987 | Sheafor et al. | 370/31 |
| 4,653,044 | 3/1987 | Kudo | 370/31 |
| 4,675,671 | 6/1987 | Ishizuka et al. | 340/825.05 |
| 4,764,920 | 8/1988 | Furuya | 370/94.1 |
| 4,771,417 | 9/1989 | Maxwell et al. | 370/35 |
| 4,817,087 | 3/1989 | Yamada | 370/85 |
| 4,841,521 | 6/1989 | Amada et al. | 370/31 |

FOREIGN PATENT DOCUMENTS 3415936 10/1985 Fed. Rep. of Germany ........ 370/31

OTHER PUBLICATIONS

Tobagi, F., "Multiaccess Protocols in Packet Communications Systems", IEEE Transactions on Communications, vol. Com. 28, No. 4, Apr. 1980, pp. 468–488.

*Primary Examiner*—Douglas W. Olms
*Assistant Examiner*—Dang Ton
*Attorney, Agent, or Firm*—Cesari and McKenna

[57] ABSTRACT

The present invention provides a method and apparatus for establishing point-to-point full duplex communication between two stations served by a local area network (LAN) or connected by a communication link. One station initially transmits a request message through the link. The request message indicates that a first station is available for full duplex communication and also serves as a test to determine whether any non-full duplex devices are present along the point-to-point link between the first station and a second station. A second station receives the request message and responds by transmitting a reply message which indicates its availability for full duplex communication. Subsequently, full duplex communication may commence. The two stations periodically exchange additional messages to continuously verify that full duplex communication is operating properly.

34 Claims, 6 Drawing Sheets

STATION-TO-STATION FULL DUPLEX COMMUNICATION IN A COMMUNICATIONS NETWORK

BACKGROUND OF THE INVENTION

1. Field of the Invention

The present invention relates generally to the field of communications networks and, more specifically, to networks which include both half-duplex communication channels and full duplex point-to-point communication channels.

2. Discussion of the Prior Art

Dramatic growth in the use of small computers and workstations has resulted in increased demand for local area networks (LANs) which are capable of serving dozens or hundreds of stations. A typical LAN includes a number of stations which are interconnected by a number of communication links. (The terms "link" and "channel" are used interchangeably herein.) A station may consist of a personal computer, workstation, bridge or any of a number of other information processing or storage devices. Some of the stations may be "half-duplex stations" meaning that they are capable of either transmitting or receiving information at any given time, but not both simultaneously. Other stations may be "full duplex stations" which are capable of transmitting or receiving information at any given time or both simultaneously. Similarly, some of the communication links may be "half-duplex links" which are capable of supporting only half-duplex communication, while other links are "full duplex links" which are capable of supporting both half-duplex and full duplex communication. Any two given stations may be effectively connected by a communication "path" which is (1) half-duplex along its entire length (consists entirely of half-duplex links), (2) partly half-duplex and partly full duplex, or (3) full duplex along its entire length.

The primary function of a LAN is to provide a communication channel or link through which a given station, possibly from a remote location, may communicate with one or more other stations. A given link within a LAN is characterized by a protocol which defines when and in what manner stations may transmit and receive information through that link. Each station using that link must operate in accordance with the protocol in order to communicate effectively with other stations and to avoid interfering with other stations. Thus, a typical protocol sets forth rules or conditions regarding timing, data formats and the like.

An example of a protocol which is widely used in business environments is set forth in ISO 8802-3:1989(E) and is sometimes referred to as "Ethernet." The protocol set forth in ISO 8802-3:1989(E) is an example of a type of protocol known as "carrier sense multiple access with collision detection" ("CSMA/CD"). As explained below, CSMA/CD is a "contention" protocol in which a plurality of stations contend for and share a single communication channel through which information is passed using a "packet switching" technique.

According to the CSMA/CD protocol set forth in ISO 8802-3:1989(E), each station is required, prior to transmitting any information through a communication channel, to first check the channel in order to determine whether any other station is transmitting at that time. If no other station is transmitting, then the station which checked the communication channel (subject to other requirements) is permitted to transmit its information. However, if another station is already transmitting, then the first station must wait a period of time and check the channel again. Thus, a mandatory requirement of the CSMA/CD protocol is that only one station may legitimately transmit information at any given time.

The requirement that each station check for activity on the communication channel prior to transmission represents one aspect of the "scheduling" that is provided by the CSMA/CD protocol. It is this scheduling which permits multiple stations to effectively communicate by sharing a single channel.

However, the scheduling provided by the CSMA/CD protocol represents a trade-off of resources or performance within the LAN. While scheduling allows a number of stations to effectively share a single communication channel over a period of time, this is accomplished at the expense of reduced bandwidth since only one station is allowed to transmit information at any given time. Specifically, because only one station may legitimately transmit information at a given time according to the CSMA/CD protocol (even though the transmitting and receiving stations and the link which connects them may all be capable of full duplex communication), only one-half the amount of information may be transferred per unit of time as compared to full duplex communication in which a station may simultaneously transmit and receive information.

Therefore, a major disadvantage of the CSMA/CD protocol is the mandatory requirement of half-duplex communication which effectively limits the bandwidth of a communication link to one-half the maximum possible bandwidth between two full duplex stations which are connected by a full duplex link.

In certain situations, even though a station has properly checked the channel prior to transmission and has determined that no other station is transmitting on the channel, a "collision" of two transmissions may nonetheless occur. For example, assume that one station has just started its transmission but, due to propagation delay, the transmitted information has not yet reached its intended destination. Simultaneously, a second station which is ready to transmit checks the channel and, unaware that the earlier (or another) transmission is still in transit, determines that no other station is transmitting and begins to transmit its own information. The information transmitted by the second station may then "collide" with the information transmitted by the first station. As a result of the collision, both of the transmitted messages may be prevented from reaching their intended destinations.

In order to recover from collisions, ISO 8802-3:1989(E) provides for a "collision detect" signal which accompanies each transmission. Each station monitors the collision detect signal and, if a collision occurs, the affected stations reattempt transmission until either successful or a maximum number of allowed attempts is reached without success.

For the collision detection technique to work properly, all transmitting stations must always have sufficient time to detect the occurrence of a collision. Consequently, the physical size of the LAN must be limited so that the propagation delay between any two stations does not exceed a defined maximum propagation delay. Observance of the maximum propagation delay time guarantees that a given transmission is either completed successfully or a collision is detected within a finite amount of time prior to completing the transmission.

To comply with the maximum propagation delay required by the CSMA/CD protocol, the maximum physical distance between any two stations must be limited. Generally, a link which operates using the CSMA/CD protocol is limited to a maximum distance of 2.8 to 4.5 kilometers. Such a short maximum distance between stations often prevents the use of such links for applications where remote stations are separated by relatively large distances.

Thus, another major disadvantage of the CSMA/CD protocol is the maximum propagation delay requirement which effectively limits the physical distance between stations and the distance covered by the LAN.

SUMMARY OF THE INVENTION

In brief summary, the present invention provides for establishing and maintaining full duplex communication between two two CSMA/CD stations which are capable of full duplex communication and which are connected by a point-to-point full duplex link. The stations may form parts of a LAN or extended LAN which includes both full duplex and half-duplex stations, as well as full duplex and half-duplex links. The stations may also be connected by other types of communication links such as a wide area network, a satellite link and the like.

In general, full duplex communication may be established between any two stations, provided that both stations and the communication link or links which connect the stations are capable of supporting full duplex communication. In cases where either one of the stations or any of the links which connect them is incapable of supporting full duplex communication, such stations may operate using half-duplex communication in a conventional manner.

The present invention operates to establish and maintain full duplex communication automatically and transparently to the user. Once established, the full duplex communication provided by the present invention effectively doubles the bandwidth of the link connecting the two stations.

In addition, because two stations which are in full duplex communication through a full duplex link cannot, by definition, experience a "collision" of transmissions, the present invention eliminates the need for collision detection and adherence to a maximum propagation delay normally required by a CSMA/CD protocol. As a result, the physical distance between the participating stations may be advantageously extended.

The present invention may be embodied in individual stations connected to a communication link. Initially, a station embodying the invention may communicate in a conventional fashion (i.e., in accordance with the CSMA/CD protocol) over the link using half-duplex communication. To begin the process of initiating full duplex communication, which may occur in response to instructions stored within a station or receipt of a predetermined instruction from an external source, the station transmits a request message through the link using half-duplex communication. The request message serves as an indicator that the station is available for full duplex communication. The request message also serves as a test for determining whether the point-to-point link between the station which transmits the request message and a second station which receives it is capable of supporting full duplex communication between the stations.

If a second station receives a valid request message that indicates the link is capable of supporting full duplex communication and the second station is available for full duplex communication, the second station transmits a reply message through the link to the first station, using half-duplex communication, to indicate its availability. Like the request message, the reply message also serves as a test for determining whether the point-to-point communication link between the first and second stations is capable of supporting full duplex communication. After a valid reply message is received by the first station, full duplex communication may commence between the two stations.

Once full duplex communication begins, the two participating stations continuously monitor the point-to-point communication link to ensure that both stations and the link continue to function properly to maintain full duplex communication. In case of a failure of one or both stations or other disruption of the link, each station reverts to half-duplex communication, thus allowing continuing communication through the link in a conventional manner.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Overview

Figure 1:
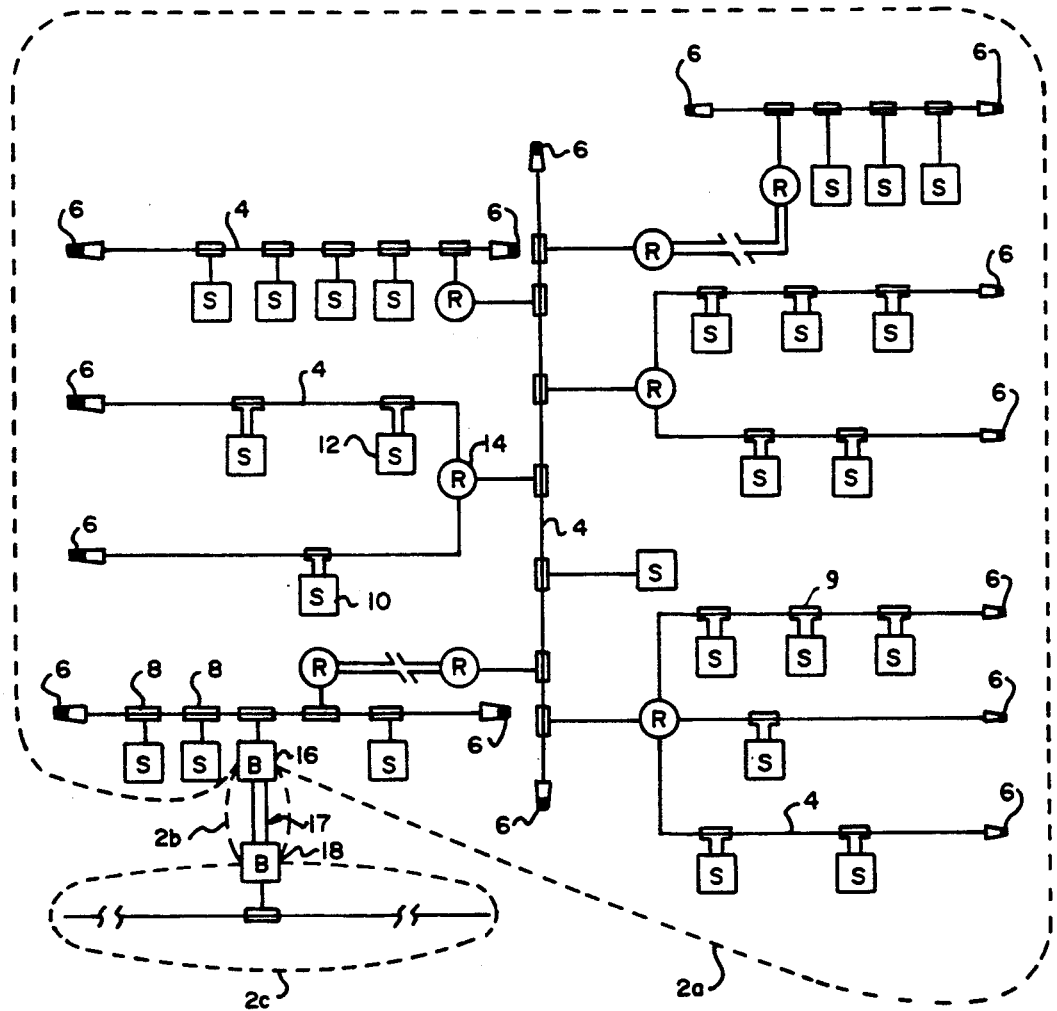
FIG. 1 is a diagram of an extended local area network.

The logical topology of an Ethernet LAN, which operates in accordance with the protocol set forth in ISO 8802-3:1989(E), is a bus (a shared medium) connecting two or more stations. Stations communicate by exchanging (transmit and receive) an atomic unit of information called a frame. The scheduling of transmission on the shared medium is controlled by the distributed media access method called CSMA/CD.

The fundamental requirement of performing full duplex communication in an Ethernet LAN is that the topology is point-to-point. This implies that there is a point-to-point link which includes a pair of disjoint, duplex, bidirectional communication paths. While operating in Full Duplex Ethernet mode, existing Ethernet interfaces are used and all services at the data link client interface are provided transparently. The standard Ethernet frame and packet formats are used without modification. (A packet consists of a preamble, start of frame delimiter (SFD), frame (containing data) and an end of transmission delimiter (ETD).) While operating in full duplex Ethernet mode, the CSMA/CD media access protocol is simplified to ignore carrier sense and collision on transmit and to ignore collision on receive.

It is possible to misconfigure a network in such a way as to connect a full duplex link interface to a half duplex Ethernet link interface. While this connection is physically possible due to connector and media compatibility, it cannot be allowed to begin full duplex operation because the protocols for each link interface are significantly different. The key difference lies in the fact that the half duplex Ethernet protocol requires monitoring the incoming carrier prior to transmission and monitoring the collision signal during transmission for proper network operation. The full duplex link interface does not require carrier monitoring because the physical channel is a full duplex point-to-point link, as opposed to a shared bus in the case of the CSMA/CD half-duplex link.

A deterministic and autoconfigurable verification procedure for full duplex links is necessary to ensure that the physical channel is full duplex point-to-point and that both ends of a point-to-point link are capable of full duplex operation. The misconfigured case of a full duplex interface connected to a half-duplex interface would lead to disruption of the network connected to the half-duplex interface. The disruption occurs because the full duplex transmitter is enabled whenever there is packet to transmit, regardless of the state of the incoming carrier. When this packet is transmitted onto the half-duplex link, a carrier can be generated at any random time. This violates the CSMA/CD access protocol and results in late collision, loss of packet, occurrence of interpacket gap shrinkage problems, etc.

The verification scheme provided by the present invention initializes itself into half-duplex Ethernet mode until it establishes that both ends of the point-to-point link are full duplex interfaces. By performing the verification process in half-duplex Ethernet mode, network disruption is prevented if the links are misconfigured. Once the verification process is completed successfully, both link interfaces transition to full duplex operation. The link is periodically tested during full duplex operation to ensure that the connection is still valid. This provides stability for the verification process. A failure during the verification process prevents a link interface from operating in full duplex mode, thus preventing potential network disruption.

FIG. 1 depicts an extended local area network 1 which includes three local area networks (LANs) 2a, 2b and 2c. Each LAN 2 may include one or more medium segments 4, network terminators 6, stations S, repeaters R and bridge-stations B. Each medium segment 4 represents a physical communication link and all of the segments 4, in combination, effectively interconnect the stations S, repeaters R and bridge-stations B. A network terminator 6 is connected at each point where a medium segment 4 physically ends.

Each station S may represent, for example, a personal computer, workstation or other information processing or storage device.

Each repeater R represents a device which connects one medium segment 4 to another and which buffers and transmits ("repeats") to one segment all information received from the other connected segment. As required by the CSMA/CD protocol, each repeater R operates at all times using half-duplex communication and is the only type of device which may connect two medium segments. The CSMA/CD protocol also requires that if a repeater R receives a "fragment" of information which contains less than a predetermined minimum number of bits, the repeater R must automatically append additional bits to the fragment to increase it to the required minimum size before transmitting (repeating) the information. More specifically, according to the protocol set forth in ISO 8802-3.1989(E), a repeater is required to extend all fragments which are less than 96 bits in length to a minimum length of 96 bits.

Each bridge-station B represents, for example, a special type of station which functions like a station S and analogously to a repeater R. A bridge-station B may connect two or more LANs, as opposed to two medium segments within a single LAN, thereby forming an extended LAN. Thus, for example, the three LANs 2a, 2b and 2c in FIG. 1 are connected together by two bridge-stations B to form the extended LAN 1. In general, a bridge-station B receives and stores information from one LAN, checks the destination of the information and, if the destination is reached, directly or indirectly, through one of the other LANs connected to the bridge-station B, forwards (transmits) the information to the appropriate LAN, toward the intended destination. If, however, the destination is part of the same LAN (or possibly another LAN connected thereto) from which the information was received, the bridge-station B does not forward such information. Thus, the bridge-station B selectively stores and forwards information.

The medium segments 4 may be constructed from a suitable medium, such as coaxial cable, optical fiber or a combination of both, which provides a communication channel through which the stations S may transmit and receive information from one another, the repeaters R and the bridge-stations S. Each station S is physically connected to a medium segment 4 by, for example, a medium attachment unit (MAU) 8 or 9. Each MAU 8, 9 may exist as a separate physical unit or may form an integral part of the station S with which it is associated. The MAUs 8 represent 10Base5 type MAUs, as specified in ISO 8802-3:1989(E), while the MAUs 9 represent 10Base2 type MAUs.

The flow of information over the LANs 2 is regulated in accordance with a protocol. Typically, each station S and bridge-station B includes a LAN interface which transmits information to and receives information from the LAN 2 of which it is a part. The LAN interface often includes a microprocessor which may be programmed to process information in accordance with the protocol. The LAN interface may also include other circuitry for converting electrical signals, which are used internally by the station, to optical signals and vice versa. Thus, any station S which includes a compatible interface may communicate over the LAN with any other station S having a compatible interface.

Two examples of the operation of the LANs 2 will now be briefly described. With continuing reference to FIG. 1, assume that the LANs 2 operate in accordance with a CSMA/CD protocol, such as ISO 8802-3:1989(E). ISO 8802-3:1989(E) requires that each station (including each bridge-station B) be assigned an address by which that station may be uniquely identified on a global basis or within a local administrative domain. Thus, whenever a station transmits information, the information includes a "source address" that uniquely identifies the origin of the information. Similarly, all transmitted information includes a "destination address" which uniquely identifies the intended destination of the information.

Assume further that a station 10 wishes to communicate with a station 12. Further assume that stations 10 and 12 are capable of full duplex communication and that full duplex communication is preferred due to the increased speed with which information may be transferred. The segment of the LAN 2a which connects stations 10 and 12 includes a repeater 14 and is a half-duplex segment. Due to the configuration of the LAN 2a, any information exchanged between stations 10 and 12 must pass through the repeater 14. The repeater 14, however, is incapable of full duplex communication and must operate at all times using half-duplex communication. Thus, the presence of the repeater 14 (or possibly other devices), as well as the half-duplex segment, in the point-to-point path between stations 10 and 12, represents a barrier to establishing full duplex communication between stations 10 and 12.

In contrast to the above example, assume now that two bridge-stations 16 and 18, both of which are capable of full duplex communication, wish to exchange information using full duplex communication. Further assume that a medium segment 17 which connects the bridge-stations 16 and 18 is a full duplex link. It should be noted that a "full duplex link" (such as medium segment 17) may comprise, for example, a satellite link, an underwater cable, a link or links which are part of a wide area network or any of a number of other communication links which are capable of supporting full duplex communication.

It should also be noted that there are no repeaters R present in the point-to-point path (i.e., medium segment 17) between the bridge-stations 16, 18. Given these circumstances, it may be possible to establish full duplex communications between the bridge-stations 16, 18, in accordance with the process set forth below.

Figure 2:
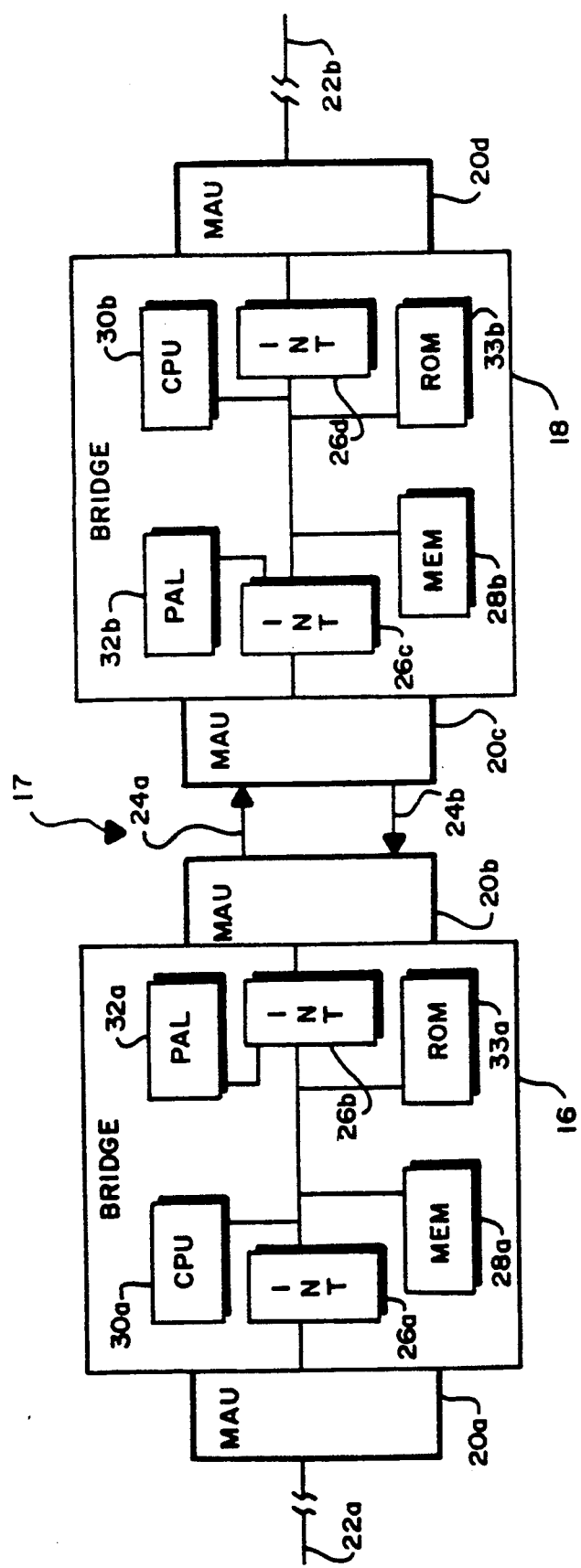
FIG. 2 is a diagram of two bridge-stations shown in FIG. 1.

FIG. 2 shows in greater detail the bridge-stations 16, 18 shown in FIG. 1. Bridge-station 16 has two associated MAUs 20a, 20b. MAU 20a is connected to a half-duplex segment 22a, while MAU 20b is connected to the full duplex segment 17. Similarly, bridge-station 18 has two associated MAUs 20c, 20d, MAU 20c being connected to the full duplex segment 17, and MAU 20d being connected to a half-duplex segment 22b. The full duplex segment 17 comprises two distinct, one-way communication paths 24a, 24b, one of which is used to transmit information from the bridge-station 16 to the bridge-station 18 (24a) and the other of which is used to transmit information from the bridge-station 18 to the bridge-station 16 (24b).

Each bridge-station 16, 18 comprises several major functional components, including a pair of MAU interfaces 26. Each bridge-station 16, 18 also includes an area of memory 28, a central processing unit (CPU) 30, a programmable logic array (PAL) 32 and a read only memory (ROM) 33. It should be understood that other components may be included in addition to or in substitution for the components shown. In general, the hardware components depicted in FIG. 2 represent conventional, commercially available electronic devices which may be purchased from any of a number of sources.

The conventional functions of the bridge-stations 16, 18 will now be briefly described. Bridge-station 16 may receive information, through half-duplex communication, via half-duplex segment 22a. The received information is temporarily stored in the memory 28a. The information received by bridge-station 16 may consist, for example, of a number of frames of data, each of which includes an address which indicates the intended destination of the associated frame. The CPU 30a checks the destination address of a given frame and determines whether that frame should be forwarded to the bridge-station 18. The CPU 30a can make this determination because it has prior "knowledge" of which destination addresses are reached via bridge-station 18. If the destination address of a given frame is reached through the bridge-station 18, then the bridge-station 16 forwards (transmits) that frame to the bridge-station 18 (via path 24a) where it is temporarily stored in the memory 28b. The bridge-station 18 subsequently forwards the frame to the appropriate destination via segment 22b.

The ROMs 33a and 33b may be used, for example, to store program instructions for the CPUs 30a and 30b, respectively, including instructions for performing the selective "store and forward" procedure just described. In addition, the ROMs 33a and 33b may be used for storing, in whole or in part, program instructions for establishing full duplex communication between bridge-stations 16 and 18, as described below.

Figure 3A:
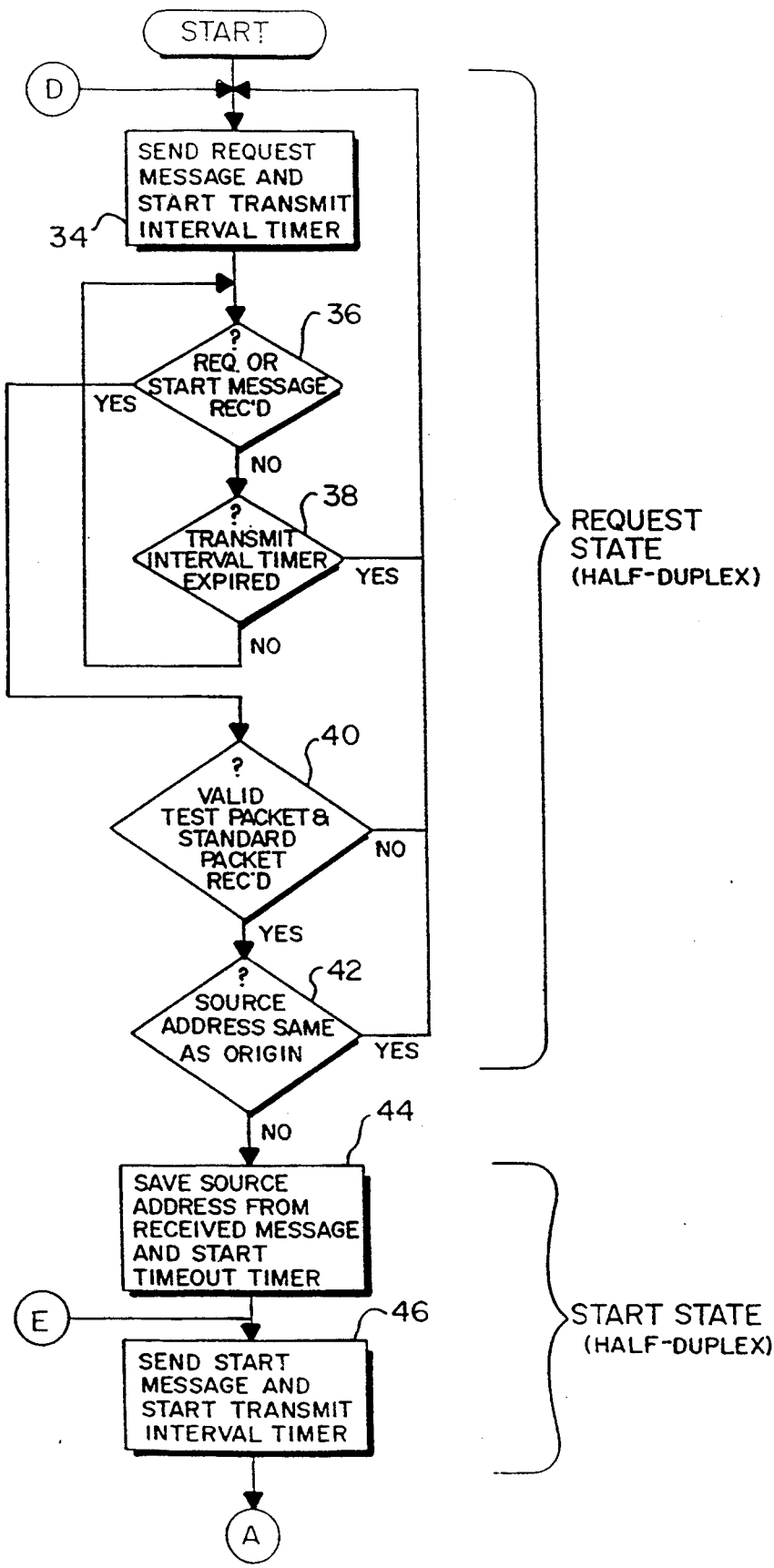
FIGS. 3A-3C are a flowchart diagram of a method of establishing and maintaining point-to-point full duplex communication between two stations in accordance with the present invention.
Figure 3B:
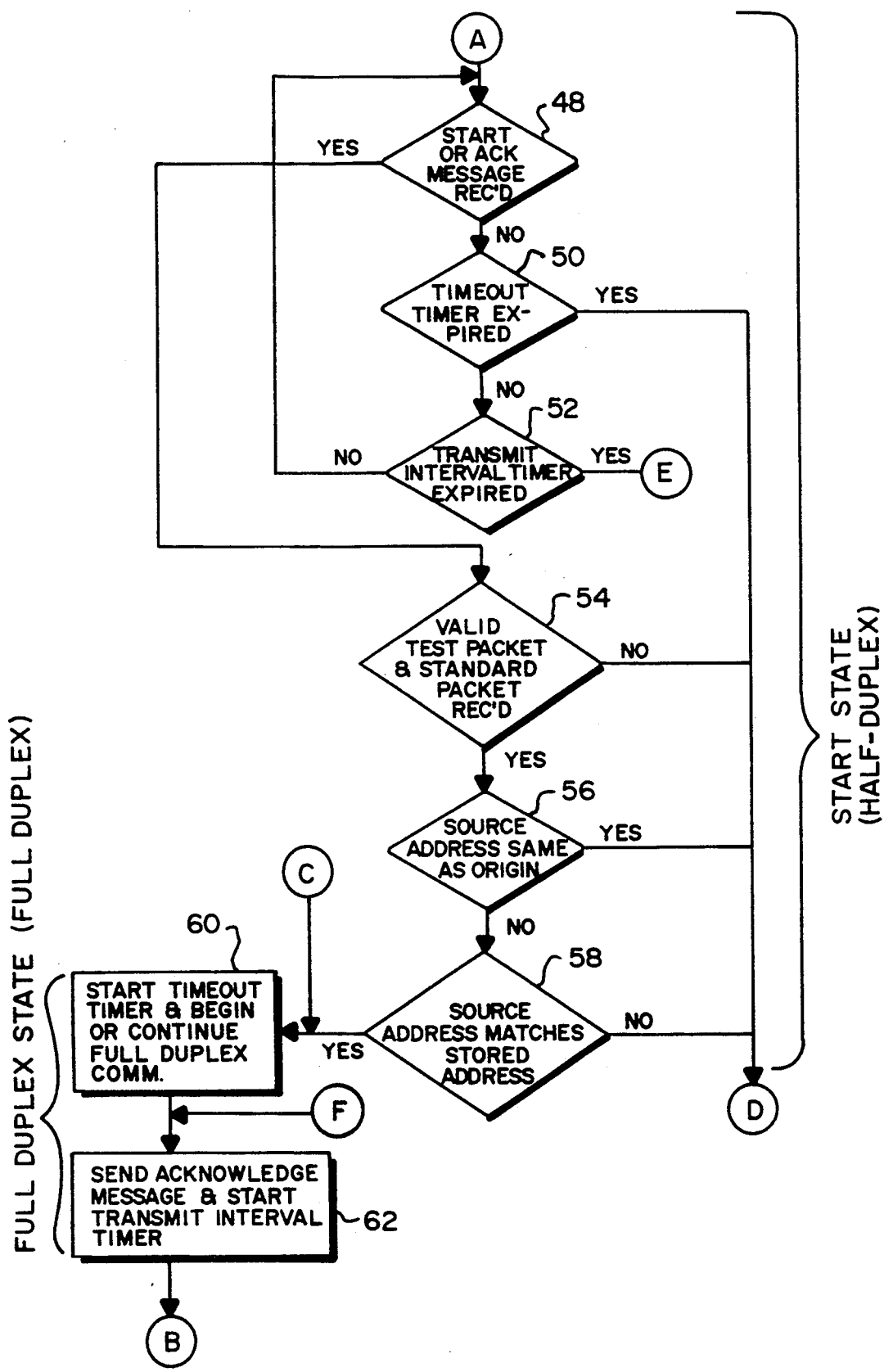
Figure 3C:
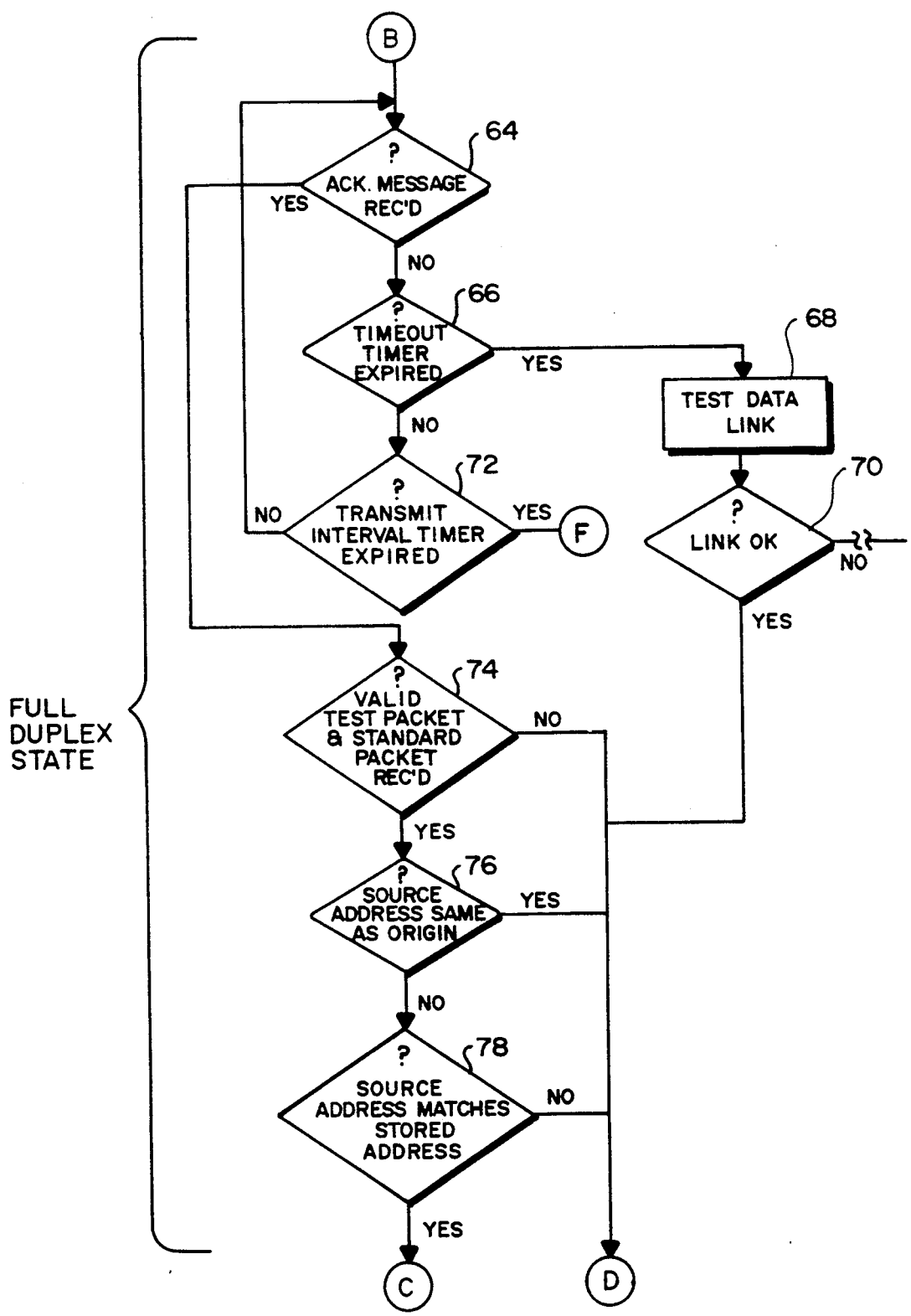

FIGS. 3A, 3B and 3C depict a method for establishing full duplex communications between two stations connected by a full duplex link which operates in accordance with a CSMA/CD type protocol. The steps of the method may be performed, for example, by circuitry associated with an individual station. For example, the circuitry of bridge-stations 16 and 18 (FIG. 2) may be used to perform the method and thereby establish full duplex communication between those two bridge-stations. It should be understood, however, that similar circuitry for performing the method may be incorporated in or associated with any suitable station which is served by the LAN including, for example, personal computers, workstations and the like.

Initially, a station which is capable of both full duplex and half-duplex communication, operates in a conventional manner using half-duplex communication in accordance with the CSMA/CD protocol. In other words, the station is initially "assuming," as a default condition, that full duplex communication is not possible and that only half-duplex communication may be used. Subsequently, either in response to a predetermined command received by the station or simply as an automatic procedure for establishing full duplex communication, the station will START the process.

The station enters a REQUEST STATE by sending (transmitting) a REQUEST message through a link of the LAN and starting a REQUEST STATE transmit interval timer, as shown at step 34. In the preferred embodiment, a nominal value for the REQUEST STATE transmit interval timer is approximately 10 seconds. It should be understood, however, that an appropriate duration for the REQUEST STATE transmit interval timer, as well as the other timers discussed below, is dependent upon the specific requirements or limitations of a particular application. In the preferred embodiment, all steps performed within the REQUEST STATE employ half-duplex communication, in accordance with the requirements of the CSMA/CD protocol, since the station sending a REQUEST message does not yet know whether it is possible to communicate on a full duplex basis with any other station.

Figure 4:
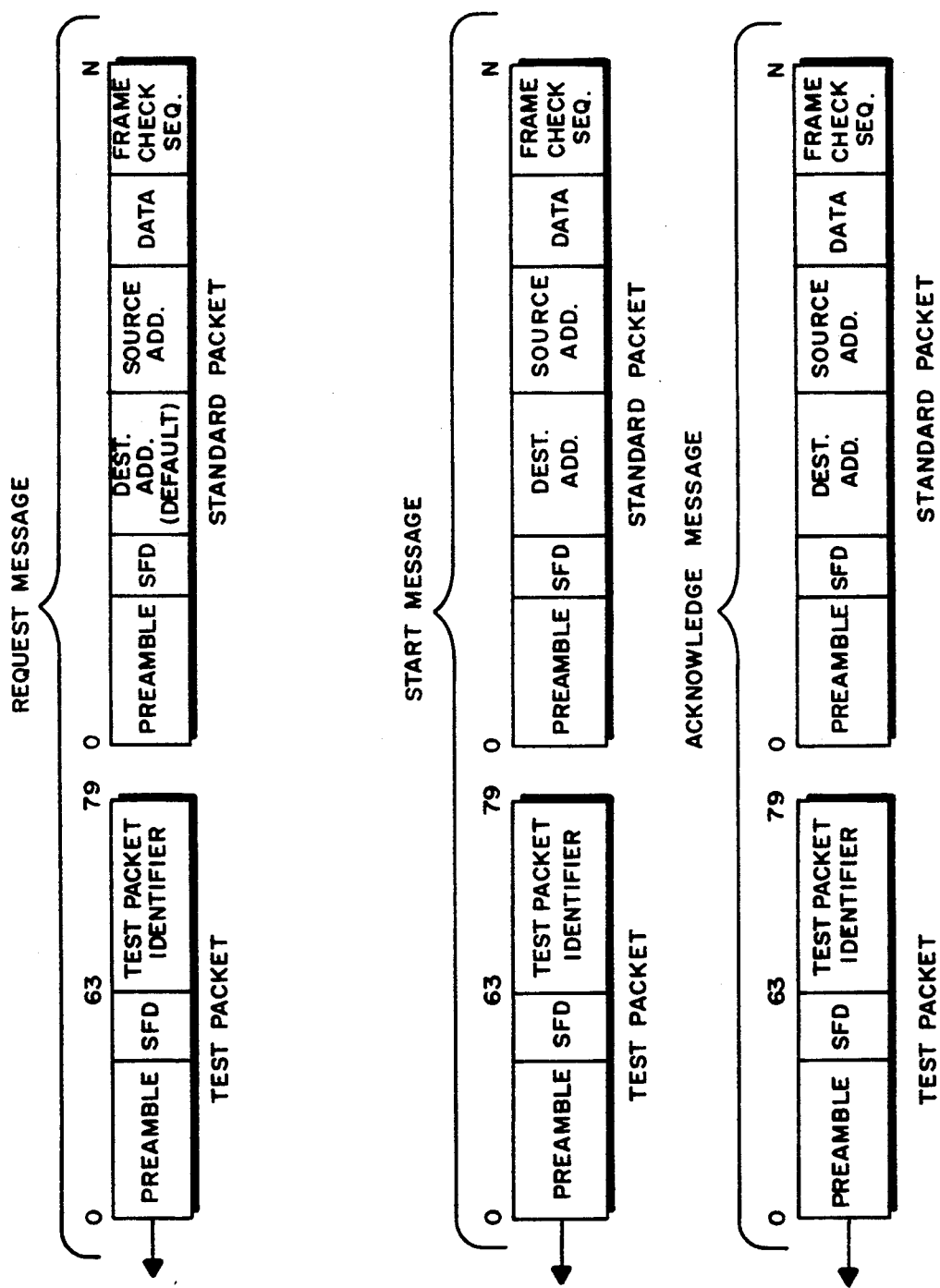
FIG. 4 is a diagram depicting the contents of the messages used in the method shown in FIGS. 3A-3C.

The REQUEST message comprises two packets, as shown in FIG. 4. The first packet of the REQUEST message is referred to as a "test packet" and contains less than the minimum number of bits required by the CSMA/CD protocol for a fragment. In the preferred embodiment, the test packet is 80 bits in length, while the CSMA/CD protocol requires a minimum fragment size of 96 bits (including preamble and SFD). The first 64 bits of the test packet comprise a preamble and start frame delimiter (SFD). The last 16 bits of the test packet comprise a test packet identifier, which is a predetermined sequence of bits that uniquely identify and distinguish the test packet from conventional or standard packets. In the preferred embodiment, a test packet identifier comprising the bits "1111 1111 1000 0000," with the left-most bit being transmitted first in time, is used.

Because the length of the test packet is less than the minimum required by the CSMA/CD protocol, the test packet will be automatically extended to the required minimum length by any repeater which the test packet passes through while traversing the LAN. In other words, if the test packet encounters a repeater while traversing the LAN, the presence of which represents a barrier to establishing full duplex communication, the test packet will be extended to the minimum length by the repeater. Otherwise, the test packet will remain at its original sub-minimum length. Thus, a station which receives a REQUEST message that includes a test packet extended to the required minimum length will "know" that the test packet encountered a repeater and that full duplex communication cannot be supported by the communication path that the test packet followed.

The test packet is followed by a "standard packet" which is N bits in length, where in N is greater than or equal to the required minimum. In the preferred embodiment, which operates in accordance with the standard set forth in ISO 8802-3:1989(E), the required minimum is 512 bits following the preamble and SFD. The standard packet comprises a preamble, followed by a start of frame delimiter, a destination address, a source address, data and a frame check sequence. In the standard packet of the REQUEST message, the destination address is actually a default address, which is a group address. A group address is used because a REQUEST message is intended as an "invitation" to other available, but as yet unidentified, stations to engage in full duplex communication with the station sending the REQUEST message. Thus, by using a default group address as the destination address for a REQUEST message, the REQUEST is "multicast" to a predetermined group of stations which are potential candidates for full duplex communication. In the preferred embodiment, the default group address comprises the bits "1001 0000 0000 0000 1101 0100 0100 0000 1000 0000 1100 0000" with the left-most bit being transmitted first. The source address portion of the standard packet uniquely identifies the station which is transmitting the REQUEST message.

Once the REQUEST message is sent, the station which sent the message checks for an incoming REQUEST message or START message from the link, as shown at step 36. It is permissible at this point to receive either a REQUEST message (from another station or possibly the original REQUEST message which has "looped back") or a START message from another station, as described in detail below. If no message is received, the station checks at step 38 to determine whether the REQUEST STATE transmit interval timer has expired. If so, the station returns to step 34 and subsequently retransmits the REQUEST message as before, subject to a special timing requirement.

A special timing requirement is needed because, as explained below, the present invention permits the construction of an extended LAN in which two given stations may be separated by a physical distance which is greater than that permitted by the CSMA/CD protocol. In other words, if one does not adhere to the maximum-distance-between-stations specified by the CSMA/CD protocol, there is no guarantee that the CSMA/CD protocol will operate to prevent two or more stations from operating in synchronization and continuously attempting to retransmit a message at the same time, thereby causing recurring collisions. Thus, because the present invention may be used in the context of an extended LAN, subsequent retransmissions of the REQUEST message are separated by variable periods of time to ensure that two or more stations do not remain in synchronization and repeatedly attempt to simultaneously transmit a REQUEST message. The provision of this variable period of time between retransmissions of the REQUEST message may be referred to as a "jitter" time component. In the preferred embodiment, the "jitter" component may have a nominal value in the range of approximately ±250 milliseconds.

At step 38, if the REQUEST STATE transmit interval timer has not yet expired, the station returns to step 36 and continues to check for an incoming message from the link.

Referring to steps 36 and 40, if either a REQUEST message or a START message was received, the receiving station first checks to determine whether the received message contains both a valid test packet and a valid standard packet. It should be understood that a test packet and a standard packet may be received at different times, even though together they represent a single message. This principle is applicable to the other types of messages described below.

A valid test packet is one which has retained its original sub-minimum length, contains at least 16 bits of preamble, a start frame delimiter, the correct test packet identifier and not more than seven additional bits following the test packet identifier. The reception of a test packet which is extended to the minimum length represents a failure of the process and a return to step 34 to begin again. A standard packet is validated by examination of the frame check sequence which is used to detect errors in the standard packet.

If valid test and standard packets are received, the source address of the standard packet is checked at step 42. If the source address of the standard packet is the same as that of the station which received the packet, meaning that the receiving station originated the packet, this is deemed a failure of the process, which then returns to step 34. However, if the source address of the received packet is different from that of the receiving station (i.e., the packet was sent by another station), then the process continues to step 44.

Beginning at step 44, the station enters a START STATE and, in the preferred embodiment, continues to operate using half-duplex communication. At step 44, the station saves the source address of the previously received message (packet) and starts a START STATE timeout timer. In the preferred embodiment, a nominal value for the START STATE timeout timer is approximately 4 seconds. The station then sends a START message and starts a START STATE transmit interval timer. In the preferred embodiment, a nominal value for the START STATE transmit interval timer is approximately 250 milliseconds.

The START message comprises two packets, as shown in FIG. 4. The first packet of the START message is a test packet which is similar to the test packet of the REQUEST message. The second packet of the START message is a standard packet which is similar to the standard packet of the REQUEST message, except that the destination address is no longer a default group address, but the address which was stored at step 44. That is, the START message is addressed to the station which transmitted the previously received REQUEST or START message.

Following the transmission of a START message, the station which sent the message checks for an incoming message from the link, as shown at step 48. It is permissible at this point to receive either a START message (from another station or possibly the original START message which has "looped back") or an ACKNOWLEDGE message from another station, as described in detail below. Any REQUEST message which is received at step 48 has no effect on the process. Thus, if a REQUEST message is received at that step, the process will "loop" through steps 48, 50 and 52 until either the START STATE timeout timer or transmit interval timer expires.

If neither a START message or an ACKNOWLEDGE message is received at step 48, the station checks at step 50 to determine whether the START STATE timeout timer has expired. If so, meaning that a maximum permissible time for receiving a message has passed, the station returns to step 34 to begin the process again. If not, the station proceeds to step 52 and checks whether the START STATE transmit interval timer has expired. If the START STATE transmit interval timer has not expired, the station simply returns to step 48 and continues to check for an incoming message. If the START STATE transmit interval timer has expired, then the station returns to step 46 and retransmits the START message.

Referring again to step 48, if either a START message or ACKNOWLEDGE message is received, the station proceeds to steps 54 and 56, which are analogous to steps 40 and 42, respectively, discussed above. At step 58, the source address of the received message is compared to the address which was saved (stored) during step 44. If the addresses are not the same, meaning that the two received messages originated from different stations, this is deemed a failure of the process, which then returns to step 34 to begin again. If the addresses are the same, meaning that both received messages originated from the same station, the station enters a FULL DUPLEX state at step 60.

At step 60, a FULL DUPLEX timeout timer is started and, in the preferred embodiment, the station switches to full duplex communication. In the preferred embodiment, a nominal value for the FULL DUPLEX timeout timer is approximately 100 seconds. The station may now simultaneously transmit information to and receive information from the station with which it has exchanged the REQUEST and START messages. At step 62, the station sends an ACKNOWLEDGE message and starts a FULL DUPLEX transmit interval timer. In the preferred embodiment, a nominal value for the FULL DUPLEX transmit interval timer is approximately 10 seconds. The ACKNOWLEDGE message comprises two packets, as shown in FIG. 4, the first of which is a test packet that is similar to the test packets of the REQUEST and START messages.

Once an ACKNOWLEDGE message is sent, the station checks at step 64 for an incoming ACKNOWLEDGE message from the link. At step 64, the receipt of a START message has no effect on the process, which would simply "loop" through steps 64, 66 and 72 until either the FULL DUPLEX timeout timer or transmit interval timer expires. At step 64, if a REQUEST message is received, this represents a failure of the process, which would then return to step 34 to begin again.

If no ACKNOWLEDGE message is received at step 64, the station checks at step 66 to determine whether the FULL DUPLEX timeout timer has expired, meaning that a maximum allowable time for receiving an ACKNOWLEDGE message has passed. If so, the station may then test the data link at step 68 to determine if it is functioning properly. If the link is functioning properly at step 70, the station then returns to step 34 to begin the process again.

Referring again to step 66, if the FULL DUPLEX timeout timer has not yet expired, then the station checks at step 72 to determine whether the FULL DUPLEX transmit interval timer has expired. If not, the station returns to step 64 and continues to check for an incoming ACKNOWLEDGE message. If so, the station returns to step 62 to retransmit an ACKNOWLEDGE message.

At step 64, if an ACKNOWLEDGE message is received, the station proceeds to steps 74, 76, and 78, which are analogous to steps 54, 56, and 58, respectively, discussed in detail above.

Because stations operating in the FULL DUPLEX state may receive or transmit information at any time or simultaneously, the bandwidth of the link connecting the stations is effectively doubled, as compared to conventional half-duplex operation in accordance with the CSMA/CD protocol. When transmitting information in the FULL DUPLEX state, each station should generate a minimum delay between packets of information to ensure sufficient separation for proper receipt by the receiving station. In the preferred embodiment, a minimum interpacket gap of 9.6 microseconds is used.

Because the FULL DUPLEX state permits full duplex communication only between two stations which are connected point-to-point by a full duplex communication link, it is unnecessary for any station in the FULL DUPLEX state to comply with the carrier sense or collision detection aspects of the CSMA/CD protocol. More specifically, it is unnecessary for a station in the FULL DUPLEX state to check the communication link for activity prior to transmitting information. In addition, it is unnecessary for any station in the FULL DUPLEX state to monitor the link for possible collisions. This is permissible because, as between the two stations connected point-to-point and operating in the FULL DUPLEX state, there can by definition be no collisions of transmitted information at any time nor any time when it is impermissible for one station to transmit information to the other.

Moreover, since the collision detection aspect of the CSMA/CD protocol may be effectively ignored by a station operating in the FULL DUPLEX state, there is no corresponding maximum propagation delay which must be observed. As a result, the physical distance between the two participating stations may be advantageously extended.

In an alternative embodiment of the present invention, a station may transmit a REQUEST message as described above, but using full duplex communication instead of half-duplex communication. This alternative embodiment may be used, for example, where a full duplex station "knows" in advance that it is connected to a communication link which will support full duplex communication. In such a case, the station transmitting the REQUEST message does not need to test the capability of the link before beginning full duplex communication, but does need to determine whether a second station is available for full duplex communication. Thus, in this alternative embodiment, a second station may transmit a START message using full duplex communication instead of half-duplex communication. The two stations may then exchange ACKNOWLEDGE messages as described above.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. In a communications network which is capable of supporting both monodirectional, half-duplex communication and simultaneous, bidirectional, full duplex communication, a method for establishing full duplex communication between two stations which are served by said network, said method comprising the steps of:
   (1) transmitting a first message over said network using half-duplex communication, said first message for indicating that a first station is available for full duplex communication and for determining whether a communication link connecting first and second stations is capable of supporting full duplex communication;
   (2) in response to the first message, transmitting a second message over said network using half-duplex communication, said second message for indicating that a second station is available for full duplex communication; and
   (3) in response to the second message, commencing full duplex communication between said first and second stations.

2. The method as in claim 1 wherein said first and second messages each comprise a destination address and a source address, said source address for identifying a station from which said message originated, said destination address for identifying a station for which said message is intended.

3. The method as in claim 2 wherein said destination address of said first message is a predetermined address which is only used by a station that is available for full duplex communication.

4. The method as in claim 3 wherein said destination address of said second message is identical to the source address of said first message.

5. The method as in claim 2 wherein a station, upon receiving said first message, compares the source address of the received first message to the receiving station's own address to determine whether the received first message originated from the receiving station.

6. The method as in claim 5 wherein if the compared addresses are different, the source address of the received first message is stored.

7. The method as in claim 6 wherein a station, upon receiving said second message, compares the source address of the received second message to the stored address to determine whether the received second message originated from the same station that originated the received first message.

8. The method as in claim 1 wherein a portion of said first message is less than a predetermined minimum length, whereby if said first portion of said first message encounters a non-full duplex device while traversing a communication link, said non-full duplex device will extend said first portion of said first message to said predetermined minimum length.

9. The method as in claim 1 wherein subsequent to commencing full duplex communication, a third message is periodically transmitted by each of said first and second stations over said communication link, said third message for verifying that said communication link is still capable of supporting full duplex communication.

10. In a communications network which is capable of supporting both monodirectional, half-duplex communication and simultaneous, bidirectional, full duplex communication, an apparatus for establishing full duplex communication between two stations which are served by said network, said apparatus comprising;
   (1) first transmitting means for transmitting a first message over said network using half-duplex communication, said first message for indicating that a first station is available for full duplex communication and for determining whether a communication link connecting first and second stations is capable of supporting full duplex communication;
   (2) second transmitting means, responsive to the first message, for transmitting a second message over said network using half-duplex communication, said second message for indicating that a second station is available for full duplex communication; and
   (3) means, responsive to the second message, for commencing full duplex communication between said first and second stations.

11. The apparatus as in claim 10 wherein said first and second messages each comprise a destination address and a source address, said source address for identifying a station from which said message originated, said destination address for identifying a station for which said message is intended.

12. The apparatus as in claim 11 wherein said destination address of said first message is a predetermined address which is only used by a station that is available for full duplex communication.

13. The apparatus as in claim 11 wherein said destination address of said second message is identical to the source address of said first message.

14. The apparatus as in claim 11 including means for receiving messages and comparing the source address of a received message with an address associated with said apparatus to determine whether the received first message originated from the apparatus.

15. The apparatus as in claim 14 wherein if the compared addresses are different, the source address of the received message is stored.

16. The apparatus as in claim 15 wherein the means for receiving compares the source address of said second message to the stored address to determine whether the received second message originated from the same station that originated the received first message.

17. The apparatus as in claim 10 wherein a portion of said first message is less than a predetermined minimum length, whereby if said first portion of said first message encounters a non-full duplex device while traversing a communication link, said non-full duplex device will extend said first portion of said first message to said predetermined minimum length.

18. The apparatus as in claim 10 further including means for periodically transmitting a third message over said communication link subsequent to the commencement of full duplex communication, said third message for verifying that said communication link is still capable of supporting full duplex communication.

19. An apparatus for establishing simultaneous, bidirectional, full duplex communication between two devices which are connected by a communication channel, said devices being capable of full duplex communication and monodirectional, half-duplex communication, said apparatus comprising:

first transmitting means for transmitting a first message through a communication channel using half-duplex communication, said first message for indicating that a first device is available for full duplex communication and for testing whether the communication channel is capable of supporting full duplex communication;

receiving means for receiving a second message from the communication channel using half-duplex communication, said second message for indicating that a second device is available for full duplex communication and for testing whether the communication channel is capable of supporting full duplex communication;

means, responsive to the receiving means, for initiating full duplex communication between said first and second devices when said communication channel is capable of supporting full duplex communication; and second transmitting means for transmitting a third message through the communication channel using full duplex communication, said third message for verifying that full duplex communication is functioning properly between said first and second devices.

20. The apparatus as in claim 19 wherein said messages each comprise a destination address and a source address, said source address for identifying the device from which said message originated, said destination address for identifying a device for which said message is intended.

21. The method as in claim 20 wherein said destination address of said first message is a predetermined address which is only used by a device that is available for full duplex communication.

22. The apparatus as in claim 20 wherein said destination address of said second message is identical to the source address of said first message.

23. The apparatus as in claim 20 wherein said receiving means, upon receiving a message from said communication channel, compares the source address of the received message with an address associated with the receiving means to determine whether the received message originated from the apparatus.

24. The apparatus as in claim 23 wherein if the compared addresses are different, the source address of the received message is stored.

25. The apparatus as in claim 24 wherein said receiving means, upon receiving a message from said communication channel, compares the source address of the received message to the stored address to determine whether the received message originated from the same device that originated the previously received message.

26. A method for establishing simultaneous, bidirectional, full duplex communication between two devices, said devices being connected together by a communication channel, said devices and said channel being capable of supporting at least monodirectional, half-duplex communication and possibly full duplex communication, said method comprising the steps of:

(1) using half-duplex communication to indicate the availability of a first device for full duplex communication and to determine whether the communication channel is capable of supporting full duplex communication;

(2) using half-duplex communication to indicate the availability of a second device for full duplex communication; and (3) commencing full duplex communication between said devices after each of said devices has indicated its availability and the communication channel is determined to be capable of supporting full duplex communication.

27. The method as in claim 26 wherein each of said first and second messages comprises first and second portions, said first portion of at least said first message for testing whether said communication channel is capable of supporting full duplex communication.

28. The method as in claim 26 further comprising the steps of:

(a) transmitting a first message through said communication channel using half-duplex communication, said first message for indicating that the first device is available for full duplex communication and for testing whether said communication channel is capable of supporting full duplex communication; and (b) in response to the first message, transmitting a second message through said communication channel using half-duplex communication, said second message for indicating that the second device is available for full duplex communication and for testing whether said communication channel is capable of supporting full duplex communication.

29. The method as in claim 28 wherein said first signal comprises a first message and said second signal comprises a second message, each of said first and second messages comprising first and second portions, said first portion of at least said first message for testing whether said communication channel is capable of supporting full duplex communication.

30. An apparatus for establishing full duplex communication between two devices, said devices being connected together by a communication channel, said devices and said channel being capable of supporting at least monodirectional, half-duplex communication and possibly simultaneous, bidirectional, full duplex communication, said apparatus comprising:

(1) means for using half-duplex communication to indicate the availability of a first device for full duplex communication and determine whether the communication channel connecting the first device to a second device is capable of supporting full duplex communication;

(2) means for using half-duplex communication to indicate the availability of a second device for full duplex communication; and (3) means for commencing full duplex communication between said devices after each of said devices has indicated its availability and the communication channel is determined to be capable of supporting full duplex communication.

31. The apparatus as in claim 30 wherein a first message is transmitted through said communication channel using half-duplex communication, said first message for indicating that the first device is available for full duplex communication and for testing whether the communication channel is capable of supporting full duplex communication, and a second message is transmitted through said communication channel using half-duplex communication, said second message for indicating that the second device is available for full duplex communication.

32. The apparatus as in claim 31 wherein each of said first and second messages includes a first portion, said first portion of at least said first message for testing whether said communication channel includes any device which is incapable of supporting full duplex communication.

33. In a communications network which is capable of supporting both monodirectional, half-duplex communication and simultaneous, bidirectional, full duplex communication, an apparatus for establishing full duplex communication between two stations which are served by said network, said apparatus comprising:

means for transmitting a first message over said network using half-duplex communication, said first message for indicating that a first station is available for full duplex communication, said first message having a first portion, said first portion of said first message having a length less than a predetermined minimum length, whereby if said first portion of said first message encounters a non-full duplex device while traversing a link within said network, said non-full duplex device will extend said first portion of said first message to said predetermined minimum length, and the receipt by a station of said first portion of said first message with a length less than the predetermined minimum length indicates that said link is capable of supporting full duplex communication;

means for receiving a second message over said network from said second station using half-duplex communication, said second message for indicating that a second station is available for full duplex communication, said second message having a first portion, said first portion of said second message having a length less than said predetermined minimum length, whereby if said first portion of said second message encounters a non-full duplex device while traversing a link within said network, said non-full duplex device will extend said first portion of said second message to said predetermined minimum length, and the receipt by a station of said first portion of said second message with a length less than the predetermined minimum length indicates that said link is capable of supporting full duplex communication; and means, responsive to receipt of said second message when said first portion of said second message is less than said predetermined length, for commencing full duplex communication between said first and second stations.

34. In a communications network which is capable of supporting simultaneous, bidirectional, full duplex communication, an apparatus for establishing full duplex communication between two stations which are connected by a communication link, said apparatus comprising:

means for transmitting a first message over said network, said first message for indicating that a first station is available for full duplex communication, said first message having a first portion, said first portion of said first message having a length less than a predetermined minimum length, whereby if said first portion of said first message encounters a non-full duplex device while traversing a link within said network, said non-full duplex device will extend said first portion of said first message to said predetermined minimum length, and the receipt by a station of said first portion of said first message with a length less than the predetermined minimum length indicates that said link is capable of supporting full duplex bidirectional communication;

means for receiving a second message over said network from a second station, said second message for indicating that a second station is available for full duplex communication, said second message having a first portion, said first portion of said second message having a length less than said predetermined minimum length, whereby if said first portion of said second message encounters a non-full duplex device while traversing a link within said network, said non-full duplex device will extend said first portion of said second message to said predetermined minimum length, and the receipt by a station of said first portion of said second message with a length less than the predetermined minimum length indicates that said link is capable of supporting full duplex bidirectional communication; and means, responsive to receipt of said second message when said first portion of said second message is less than said predetermined length, for commencing full duplex communication between said first and second stations.

* * * * *